Patented July 25, 1933

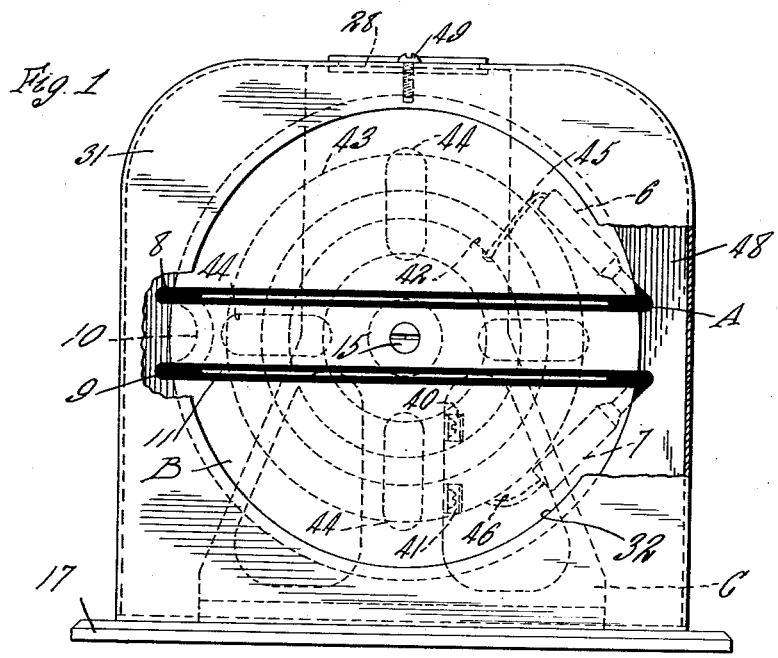

1,919,791

UNITED STATES PATENT OFFICE

JOHN D. LARKIN, 3D, OF BUFFALO, NEW YORK

EYE TESTING APPARATUS

Application filed January 15, 1931. Serial No. 508,952.

This invention relates to improvements in apparatus for use in connection with testing eye sight, such, for example, as apparatus for use in connection with hyperopic astigmatism tests.

The objects of this invention are to provide an apparatus of this kind, in which light is passed through narrow slits to the person whose eyes are being tested, and to place these slits into different angular positions to determine the angle at which the slits can be seen most clearly; also to provide an apparatus of this kind, in which a strong artificial light may be passed through a narrow slit or slits, which light is more readily visible than indirectly illuminated lines of contrasting color heretofore used; also to provide an apparatus of this kind, in which the angular position of the lines of light may be accurately determined to enable an oculist to make the necessary correction for astigmatism; also to improve apparatus of this kind in other respects hereinafter specified.

In apparatus of this type, as heretofore used, the testing of the eyes for astigmatism has generally been done by means of black lines on a white background. Persons with poor vision frequently find it difficult to see the lines, so that the tests cannot be made with much accuracy, and persons with extremely poor vision sometimes are entirely unable to see these lines. I have found that by passing light through long narrow slits, these slits can be seen by persons of extremely poor vision, who cannot see black lines on a white background, and also that by passing light through these slits more accurate tests for astigmatism can be made in the case of persons of fairly good vision, and some forms of artificial light, such for example as neon light, which, when passed through narrow slits, can be seen by persons who are almost blind.

In the accompanying drawing:

Fig. 1 is a front elevation of an eye testing apparatus embodying this invention;

Fig. 2 is a side elevation thereof, partly in section;

Fig. 3 is a fragmentary top plan view.

In accordance with the embodiment of my invention shown in the accompanying drawing, I employ a neon tube A mounted on a disk or other supporting member B, adjustable about its axis relatively to a standard or support C.

The neon tube may be of any suitable or desired form, that shown having the two usual enlarged ends 6 and 7 to which electric current may be conducted in any suitable or desired manner. The tube shown is shaped or bent to provide two parallel straight parts 8 and 9 extending across the front face of the disk B, which is of opaque material, and preferably black on its front face. The enlarged ends of the tube are arranged at the rear face of the disk, and the opposite ends of the two straight parts 8 and 9 may be connected at the back of the disk by a portion 10 of the tube. By means of this arrangement, only two straight parts of the tube are visible at the front face of the disk B. This tube may be suitably secured on the disk by any desired means (not shown). While a neon tube forms a very convenient and effective source of light for use in connection with my apparatus, yet it will be understood that it is not intended to limit this invention to use with neon tubes, since other sources of light may be used in connection with my apparatus. It will also be understood that the neon tube may be bent into different shapes.

Preferably, the light from the light source is passed through narrow slits to the observer or person whose eyes are being tested, and these slits may be provided in any suitable manner. In the particular apparatus illustrated in the drawing, and which it will be understood embodies only one form of my invention, the neon tube is coated or cover with an opaque substance, which is preferably black, and at the front faces of the two straight parts 8 and 9 of the tubes, the opaque covering is provided with narrow slits 11 through which light from the tube may pass. By means of this arrangement, only two narrow, thin lines of light are visible at the front of the apparatus, but it will be understood that one or more than two of such lines may be provided, if desired.

The disk B may be rotatably mounted on the standard or support C in any suitable or desired manner. In the construction shown, this disk has a central stud or shaft extending rearwardly therefrom and journalled in bearing lugs 14 formed on the standard C, a screw 15 being shown for securing the disk to the stud or short shaft, and a collar or sleeve 16 is secured to the end of the stud or shaft, which prevents endwise movement of the same relatively to the bearing lugs 14. The standard may be provided with any suitable base or foot 17.

Means are preferably provided for adjusting the disk B in any desired angular relation about its axis, and for holding the disk in adjusted position. In the particular constructon shown, the sleeve 16 is provided with a gear 19 which may be either formed integral therewith or secured thereto and connected with the stud by a set screw 20. This gear meshes with a pinion 21 suitably secured on a stem or short shaft which is journalled in a bearing lug 22 formed on the standard C. The pinion 21 may be rotated in any suitable manner for example by means of a knurled knob or hand wheel 24, so that by turning the knob 24, the disk B may be turned into different angular positions. Any other means for turning the disk B may be employed, or if desired, the adjusting means may be dispensed with and the disk turned into different positions by hand.

It is also desirable to provide the eye testing apparatus with means for accurately determining the angle at which the slits 11 are set. For this purpose, the disk may be provided at its outer edge with a rearwardly extending flange 27, which is graduated in degrees. Any suitable fixed or stationary indicator cooperating with the graduations on the flange of the disk B may be provided. For example, the indicator may be in the form of a transparent plate 28 having a hair line 30 thereon with which the graduations on the disk B may register.

The stationary indicator 28 may be mounted in fixed relation to the disk in any suitable or desired manner, and in the particular construction illustrated, this indicator is mounted on the upper portion of a housing or frame plate 31 suitably secured to the base 17. Preferably, this plate has a circular opening 32 therein through which the front face of the disk and the illuminated slits may be seen, the opening 32 being preferably smaller than the diameter of the disk B, so that the edge portions of the disk are concealed.

Electricity may be conducted to the neon tubes or other light source in any suitable or desired manner. In the particular construction shown, 33 represents a transformer of the kind commonly employed in connection with neon tubes, this transformer being shown mounted on the base 17 and current may be conducted to the transformer through a suitable socket 34 cooperating with a detachable plug 35 having conductors 36 for connection with an ordinary alternated current house lighting circuit.

The secondary circuit of the transformer includes the usual conductors 38 and 39 which in turn connect with spring contact members or brushes 40 and 41 respectively which are supported on the standard C and insulated therefrom and from each other. These spring contacts or brushes contact with a pair of rings 42 and 43 respectively which are suitably mounted on the disk B, preferably on insulating blocks 44 secured to the disk. The enlarged ends of the tubes are connected to the conducting rings 42 and 43 in the usual manner by means of conductors or wires 45 and 46, the conductor 45 preferably passing to the ring 42 through the space between the ring 43 and the disk B. By means of this arrangement, the disk may be turned to any desired angular position without interfering with the electric connections to the neon tubes. Any other reasons for connecting the neon tubes or other light source with the electric circuit may, however, be employed.

If desired, the rear portion of the apparatus may be located in a suitable housing or enclosure 48, the front edges of which preferably interfit with the rear edges of the housing member or frame plate 31. The housing member 48 may be secured to the apparatus in any suitable or desired manner, for example, by means of a screw 49 attached to the standard C and the housing may also be provided with openings or apertures 50 and 51 therein which permit the removal of the housing without any interference by the knurled knob 24 or the electric connecting plug 34.

In the use of the device, the oculist turns the disk B and the illuminated slits mounted thereon into various angular positions to determine the angle at which the astigmatism of the observer permits him to see the slits most correctly or clearly. The graduations on the edge or flange of the disk are so arranged that the angular relation of the slits can be correctly read through the indicator 28.

I claim as my invention:

1. An eye sight testing apparatus, including a disk mounted to be adjusted about its axis, a light source in the form of a tube mounted on said disk and having a straight part extending across the front face of said disk and having its ends arranged at the rear of said disk, and means for partially covering said straight portion of said tube to cause light to pass from said tube only through a narrow slit.

2. An eye sight testing apparatus, including a disk mounted to be adjusted about its axis, a light source in the form of a tube mounted on said disk and having a straight part extending across the front face of said disk and having its ends arranged at the rear of said disk, means for partially covering said straight portion of said tube to cause light to pass from said tube only through a narrow slit, and means on said disk for determining the angular position of the straight part of said tube.

3. In an eye sight testing apparatus, the combination of an illuminating device in the form of a tube, a disk on which said tube is mounted and which is pivoted to swing about its axis, said tube being secured to said disk to swing therewith and including a plurality of straight portions extending crosswise of the front face of said disk, all other portions of said tube being arranged in rear of said disk, means associated with said straight portions of said tube for admitting light therefrom only through narrow slits, and means for determining the angular positions of said straight portions of said tube.

4. An eye sight testing apparatus, including a disk having a dark surface and mounted to turn about a horizontal axis to various angles, and a neon light tube secured on said disk and having two straight lengths thereof extending crosswise of said disk, said lengths being covered with opaque material having slits lengthwise thereof through each of which a fine line of light may be seen.

5. In an eyesight testing apparatus, a support, a transverse member at the front thereof, a transverse, elongate tube mounted upon the face thereof so as to be disposed crosswise of the line of sight of a patient, opaque material applied to said tube so as to leave only a fine, elongate unobscured slit at the front and extending lengthwise of said tube, and an electrically illuminated gas in said tube which by reason of its contact with the walls thereof, provides an intense line of light through said slit at the surface of said tube, the rays from which pass directly to the eyes of the patient.

JOHN D. LARKIN, 3D.